(12) United States Patent
Mital

(10) Patent No.: US 8,090,622 B2
(45) Date of Patent: Jan. 3, 2012

(54) PREFERRED ITEMS LIST MANAGEMENT

(75) Inventor: Amit Mital, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 11/859,583

(22) Filed: Sep. 21, 2007

(65) Prior Publication Data

US 2009/0083161 A1 Mar. 26, 2009

(51) Int. Cl.
*G06Q 30/00* (2006.01)
(52) U.S. Cl. ............... 705/26.1; 705/27.1; 705/27.2; 705/26
(58) Field of Classification Search .............. 705/26.1, 705/26, 27.1, 27.2
See application file for complete search history.

(56) References Cited

U.S. PATENT DOCUMENTS

| | | | |
|---|---|---|---|
| 6,901,373 B1 | 5/2005 | Chasko | |
| 6,934,964 B1 | 8/2005 | Schaffer et al. | |
| 7,792,703 B1* | 9/2010 | Amidon et al. | 705/26.1 |
| 2004/0138943 A1 | 7/2004 | Silvernail | |
| 2004/0219971 A1 | 11/2004 | Ciancio et al. | |
| 2004/0230482 A1 | 11/2004 | Hendrickson | |
| 2006/0184448 A1 | 8/2006 | Polston et al. | |
| 2007/0100739 A1 | 5/2007 | Cui et al. | |
| 2007/0129995 A1 | 6/2007 | Brandow | |
| 2007/0250403 A1* | 10/2007 | Altschuler | 705/26 |
| 2008/0027878 A1* | 1/2008 | Street et al. | 705/78 |
| 2008/0080691 A1* | 4/2008 | Dolan et al. | 379/201.01 |
| 2009/0138380 A1* | 5/2009 | Roseman et al. | 705/27 |
| 2009/0282026 A1* | 11/2009 | Nash | 707/5 |

FOREIGN PATENT DOCUMENTS

| | | |
|---|---|---|
| EP | 1594277 A2 | 11/2005 |
| EP | 1686820 A1 | 8/2006 |
| GB | 2408815 A | 8/2005 |

OTHER PUBLICATIONS

"BizSellBuy—Businesses for Sale", i4U Australia Website Design, 2007, p. 1.
"Connecting Sellers to Buyers in Targeted Business Markets", pp. 8.
"In the $77.8 Billion Electrical Market1, How Big is Your Piece of the Pie?", pp. 1-12.
"Astra Zeneca: A Case History of Serving up Healthy Ideas", pp. 1-5.
International Search Report for PCT/US2008/075665 mailed Mar. 17, 2009. 10 Pages.

* cited by examiner

*Primary Examiner* — Yogesh C Garg

(57) ABSTRACT

Systems and methods of generating a list of preferred items are disclosed herein. A uniform resource identifier that references a listing web service is provided. A call to the listing web service is received from a linking website. The call to the listing web service includes an item identifier corresponding to an item that the consumer is willing to purchase. The call can be executed as a result of the consumer selecting a listing icon that references the uniform resource identifier. The listing icon is displayed on the linking website hosted at a linking domain. The listing web service can be executed to add the item to the list of preferred items associated with the consumer. The list of preferred items is displayed on a listing website. The listing website can be hosted at a listing domain which is different from the linking domain.

20 Claims, 6 Drawing Sheets

PREFERRED ITEMS LIST MANAGEMENT

BACKGROUND

A large fraction of the Internet ecosystem is funded by the desire to acquire customers. Merchants place advertisements in the hope of generating brand awareness, demand, and leads. Advertisement can be of varying efficiency and precision of targeting. In general, advertisements tend to be an expensive, indirect and expensive way of generating sales. Nevertheless, the presentation of advertisements is a large and explosively growing business.

Increasingly, consumers buy goods online by browsing online merchant sites and are often led to the merchant site via an advertisement. However, merchants face more difficulty in directly finding consumers that are interested in the merchants' products.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various techniques and technologies directed to permitting a consumers to publish lists of items that they are interested in purchasing. A listing icon can be added to any website to allow a user to add the item for sale to a list of preferred items hosted at a listing site. For example, the website can be a website of a merchant, manufacturer, a search results webpage, and the like. When selected, the listing icon can invoke a web service that adds an entry to the list of preferred items. A consumer that selects to add the item for sale the list of preferred items can also select a price that the consumer is willing to pay for the item. For example, the consumer can indicate a specific price that the consumer would pay for the item added to the preferred items list. The specific price can be a maximum price. The listing site can be hosted at a listing domain, while the linking site can be hosted at a liking domain. In addition, using preferred items lists, merchants can efficiently search for and connect to consumers.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented as a system for managing preferred items lists in the context of products, it is also contemplated the a preferred item may be a service that the consumer wants to receive. As such, the system described is provided as an example and not a limitation. As those skilled in the art will appreciate, the present examples are suitable for application in a variety of different types of preferred items list management.

Described herein are various techniques and technologies directed toward an implementation of generating and managing lists of user-preferred items. Consumers are provided with the ability to publish lists of items that they are interested in purchasing. A listing icon can be added to any website to allow a user to add the display item to a list of preferred items hosted at a listing site. When selected, the listing icon can invoke a web service that adds an entry to the list of preferred items. In addition, using preferred items lists, merchants can to efficiently search for consumer data.

Figure 1:
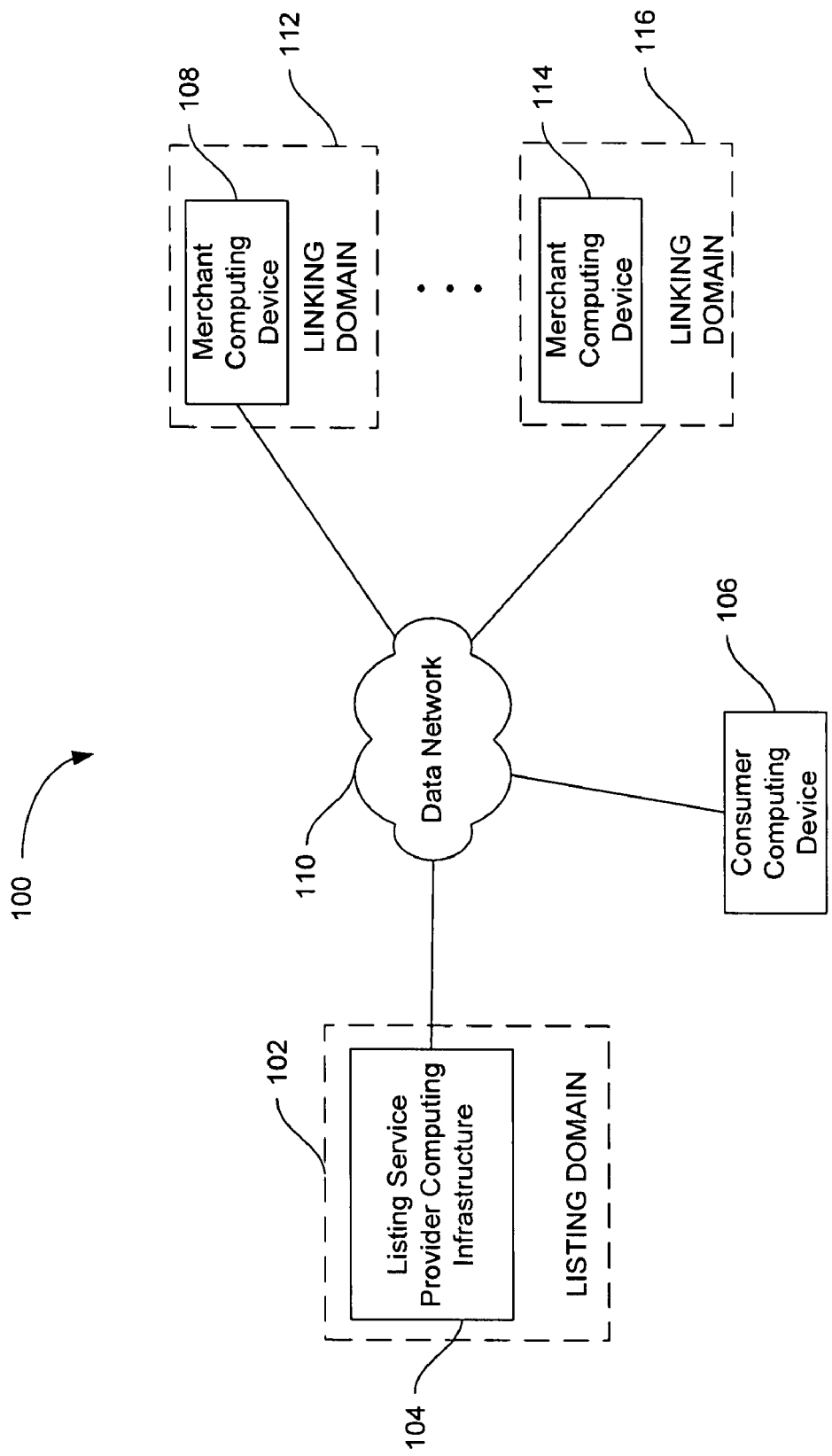
FIG. 1 illustrates a component diagram of a system for managing a preferred items list according to one embodiment.

FIG. 1 illustrates a component diagram of a system for managing a preferred items list according to one embodiment. A listing service provider can be a business entity that owns and operates a listing service provider computing infrastructure 104. The system 100 can include the listing service provider computing infrastructure 104 that communicates over a data network 110 with multiple consumer computing devices and merchant computing devices. The data network 110 can be the Internet, an intranet, or any computer network that allows communication between various computer systems. The listing service provider computing infrastructure 104 can include one or more computing devices and modules that permit the management of preferred items list of various consumers. In one aspect, the listing service provider computing infrastructure 104 is addressed within the data network as being part of a listing domain 102. Thus, the listing domain 102 can be any network domain that operates within the data network 110.

Each consumer computing device can be part of a linking domain, such as linking domain 112 or linking domain 116. As disclosed herein, the linking domain can be different than the listing domain. Therefore, a merchant or advertiser that displays a product and an associated link to the listing service provider can communicate from the linking domain to the listing domain.

A consumer computing device 106 can also be communicated with the listing service provider computing infrastructure 104 and with one or more merchant computing devices 108, 114. For example, the consumer computing device 106 may request a webpage from the merchant computing device 108 at the linking domain 112. The merchant computing device 108 can then submit a webpage with an advertisement of an item for sale, or data regarding an item for sale. The data can include a universal resource identifier that references a listing web service hosted at the listing service provider computing infrastructure 104. Therefore, the consumer can select the hyperlink and invoke the listing web service at the listing service provider computing infrastructure 104. Once the web service is invoked, the web service can make a new entry to a preferred items list. The preferred items list can then be published on a website hosted by the listing service provider computing infrastructure 104.

As such, the listing service provider computing infrastructure 104 can be configured to provide a uniform resource identifier that references the listing web service. The call to the listing web service can include an item identifier corresponding to an item that the consumer is willing to purchase. In one embodiment, the call is received from the consumer computing device when the consumer selects the listing icon that references the uniform resource identifier. In one embodiment, the consumer can select a specific price that the consumer is willing to pay for the item. The specific price can be a maximum price.

The listing icon can be displayed on the linking website hosted at a linking domain, such as linking domain 112 or linking domain 116. The listing web service can then add the item to the list of preferred items associated with the consumer. In one embodiment, the list of preferred items can be displayed on a listing website. The listing website can be hosted at a listing domain which is different from the linking domain. In one aspect, the listing website can be accessible to the public via the data network 110. In another embodiment, the listing website is private and is only accessible to private entities that have been provided with viewing privileges.

In one embodiment, the listing service provider can act as a repository of preferred items lists and can charge a percentage of the item price every time an item in the preferred list of items is purchased for the consumer.

In another embodiment, the listing service provider computing infrastructure can be configured to aggregate preferred items lists and determine at least one item that a threshold number of consumers have added to their preferred items lists. In one example, once the item is determined, the listing service provider can purchase the item in bulk and provide the item discounted to the consumers. In another example, the listing service provider can purchase the item in bulk and sell the item at the regular retail price in order to profit from the added margin. In yet another example, the listing service provider can put one or more consumers in contact so that they can get together and purchase in bulk.

In one embodiment, the listing service provider can store and organize consumer data including preferred items lists in order to allow merchants to search and find consumers interested in the merchants' items. In addition, the listing service provider can provide consumer data to merchants for a fee.

The listing service provider computing infrastructure can further be configured to manage consumer offers and keep those offers specific to the products desired by the consumer. In a further embodiment, the listing service provider computing infrastructure can be configured to translating vague user desires into a specific item or set of items that match their desires. Finally, the listing service provider computing infrastructure can allow entries of bloggers and reviewers to be linked to items listed in preferred items lists. Reviewers can have a feedback score associated with them. This ensures that the reviewers give honest reviews of the items. The reputation of a reviewer could directly translate into a greater bounty. In addition, reviewers are motivated to improve their reputation because that translates to greater credibility and traffic.

Figure 2:
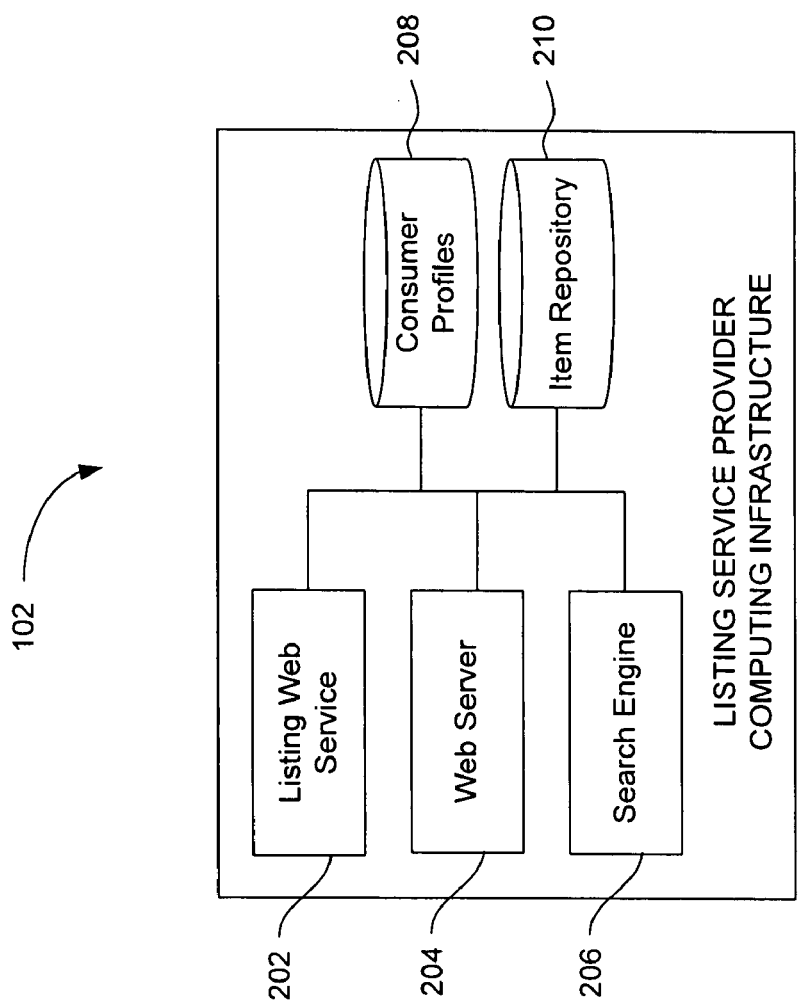
FIG. 2 illustrates a component diagram of a listing service provider computing infrastructure according to one embodiment.

FIG. 2 illustrates a component diagram of a listing service provider computing infrastructure according to one embodiment. The listing service provider computing infrastructure 102 can include a listing web service 202, a web server 204, and a search engine 206.

The web server 204 can be configured to provide a uniform resource identifier that references the listing web service 204. The uniform resource identifier can then be displayed at a merchants' website for a consumer to select to add an item to the list of preferred items. The web server 204 can also be configured to render a listing website that displays the list of preferred items. The listing website being can be hosted at a listing domain which is different from the linking domain.

The listing web service 202 can be invoked by a call that includes an item identifier corresponding to an item that the consumer is willing to purchase. The item identifier provided to the listing web service can be a Universal Product Code ("UPC"), an International Standard Book Number ("ISBN"), or any other alphanumeric string that uniquely identifies the item. The call to the listing web service 202 can be executed as a result of the consumer selecting a listing icon that references the uniform resource identifier. The listing web service 202 can be configured with logic to receive the item identifier, and add an entry to the preferred items list of the consumer. A new entry can be added to the item repository 210 and saved in reference to the preferred items list as part of the consumer profile. The consumer profile can be stored at the consumer profiles database 208.

The search engine 206 can allow merchants to search against the database consumer profiles 208 for prospective buyers. Merchants could potentially directly access consumers, bypassing an inefficient and expensive supply chain. As a result of the search, the merchants could get a list of the consumers' data, such as email addresses, that they could then send offers to.

Since the consumer profiles database 208 includes the contents of the preferred items lists of multiple consumers, the consumer profiles database 208 can be exploited by the listing service provider. In one example, if twenty consumers wish to purchase a specific type of product, using collective buying power, the listing service provider computing infrastructure 102 could negotiate a lower rate for such a product while keeping some of the differential as commission.

Figure 3:
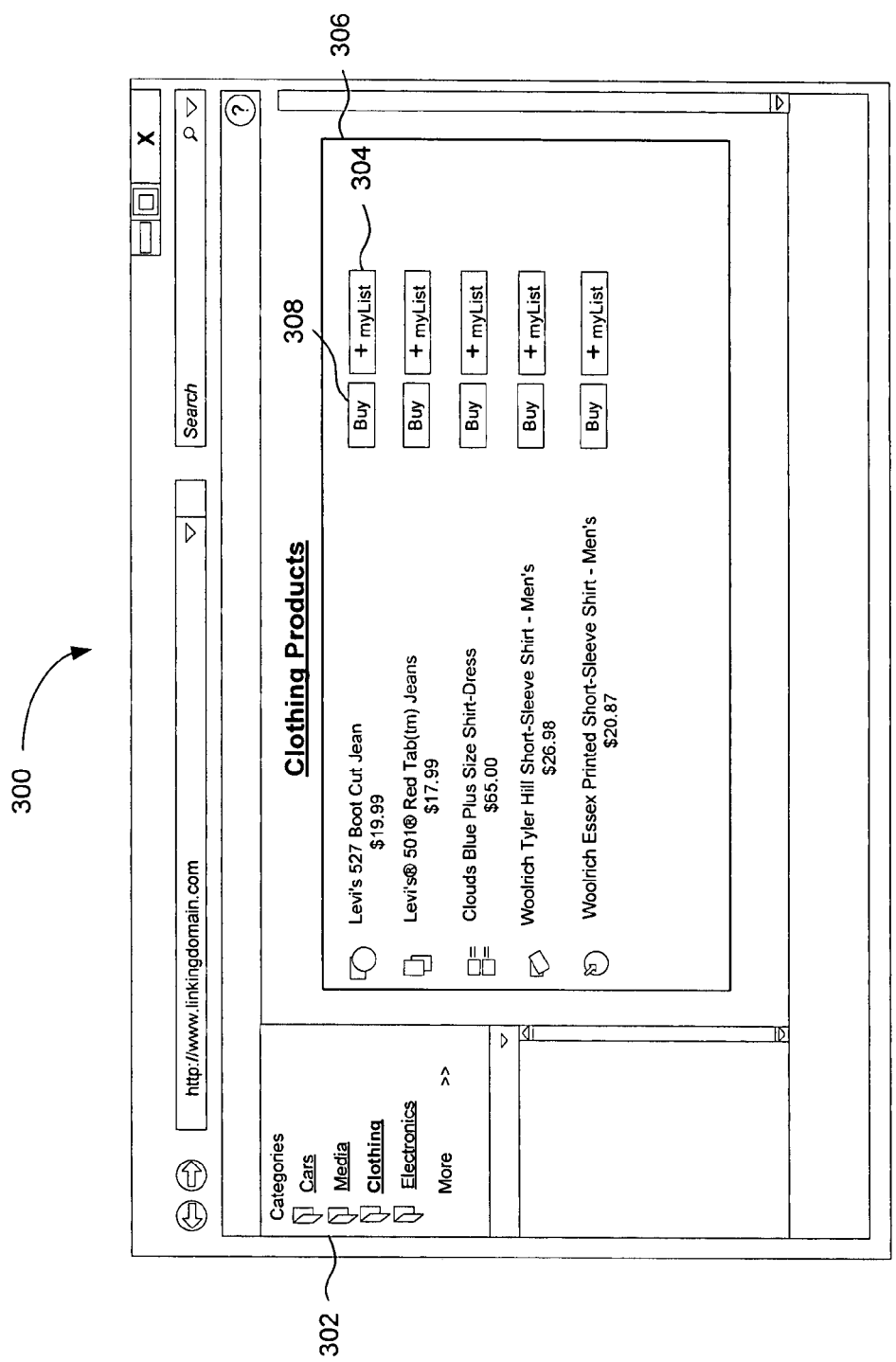
FIG. 3 illustrates an exemplary user interface diagram of a linking webpage for adding an item to a preferred item list according to one embodiment.

FIG. 3 illustrates an exemplary user interface diagram of a linking webpage 300 for adding an item to a preferred item list according to one embodiment. The linking webpage 300 can be part of a website of a merchant that displays products online. For example, the merchant can include multiple categories for searching items in a display pane 302. In addition, a product display 306 can show one or more products been sold by a merchant. Products in the product display 306 can have an associated purchasing icon 304 that can be used by a consumer to immediately purchase the product from the merchant. Furthermore, products in the product display 306 can have an associated listing icon 304 that can be used by a consumer to add the product to the preferred items list. Thus, once selected, a listing web service can be invoked in order to add an entry to the preferred items list. In one aspect, the web service can prompt the consumer for things to look out for. In one example, the web service can prompt the consumer for a maximum price that the consumer is willing to pay for the purchase of the item.

As previously mentioned, the listing web service can be configured to add the item to the preferred items list, which resides on a listing website that is not necessarily associated with the linking website. Therefore, the linking webpage 300 can be hosted at a linking domain, while the preferred items list can be hosted at a listing website hosted at a listing domain.

Figure 4:
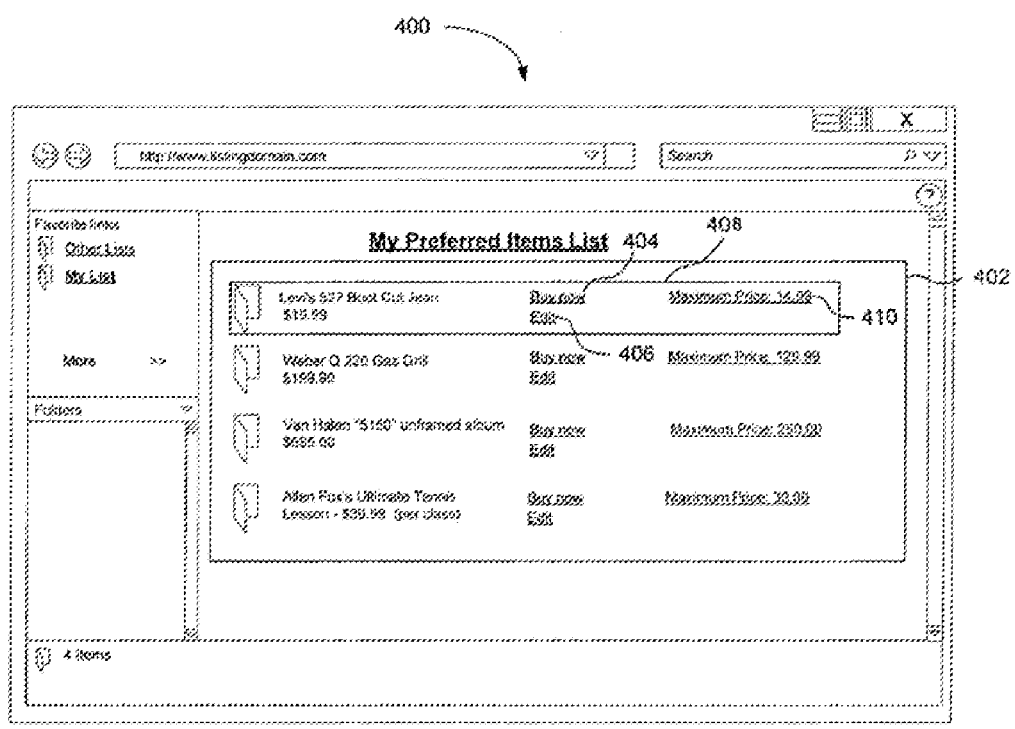
FIG. 4 illustrates an exemplary user interface diagram for viewing a preferred items list according to one embodiment.

FIG. 4 illustrates an exemplary user interface diagram of a listing webpage 400 for viewing a preferred items list according to one embodiment. The listing webpage 400 can include a preferred items list 402. As previously mentioned, the listing web service of the listing service provider can be configured to add the item to the preferred items list. In one example, if the consumer selects the listing icon 304, the listing web service can then add the item to the preferred items list as shown by item 408. The listing webpage 400 can be hosted at a listing domain, which can be a different domain than the linking domain of the linking webpage 300.

Item 408 can be listed with item metadata such as a thumbnail, description of the item, item identifier such as UPC or ISBN number, Manufacturer Suggested Retail Price (MSRP), the price the consumer is willing to pay for the item, raking of the item within the list, conditions for purchasing, referrer information, and the like. Thus, for example for item 408, the consumer can enter the price that the consumer is willing to pay for the item.

For example, the consumer can indicate a price that the consumer would pay for the item. The price can be a maximum price that the consumer is willing to pay. Therefore, a price indicator 410 can be used to show the maximum price that the consumer wants to pay.

The listing webpage 400 can be viewed and edited by the consumer. Thus, the consumer can change information on the list. For instance, by selecting the edit button 406, the consumer can edit the price the consumer is willing to pay for the item, the raking of the item within the list, conditions for purchasing, and the like.

The listing webpage 400 can also be viewed by other consumers. For instance, a friend or relative of the consumer can visit the listing webpage 400 and select to purchase the item for the consumer. In one example, the button 404 can be used to purchase the item for the consumer. In addition, the other consumers can view the price indicator 410 and have guidance as to how much the consumer values a specific item based on how much the consumer is willing to pay for such item. In one example, this can permit a friend or a relative of the consumer to purchase the item for the consumer at a price at which the consumer himself is willing to purchase.

Furthermore, a merchant can also view the listing webpage 400 and submit offers. Thus, when the consumer returns to the listing webpage 400, an offer submitted by a merchant can be displayed for the consideration of the consumer. In addition, merchants may also be allowed to place an advertisement next to a given item. Thus, a highly relevant add by a merchant can be displayed for a competing brand of the same item, or for supplementary items.

A merchant that views the price indicator 410 can have the opportunity to view the price at which the consumer is willing to purchase the item, and offer the item for sale at such price.

Figure 5:
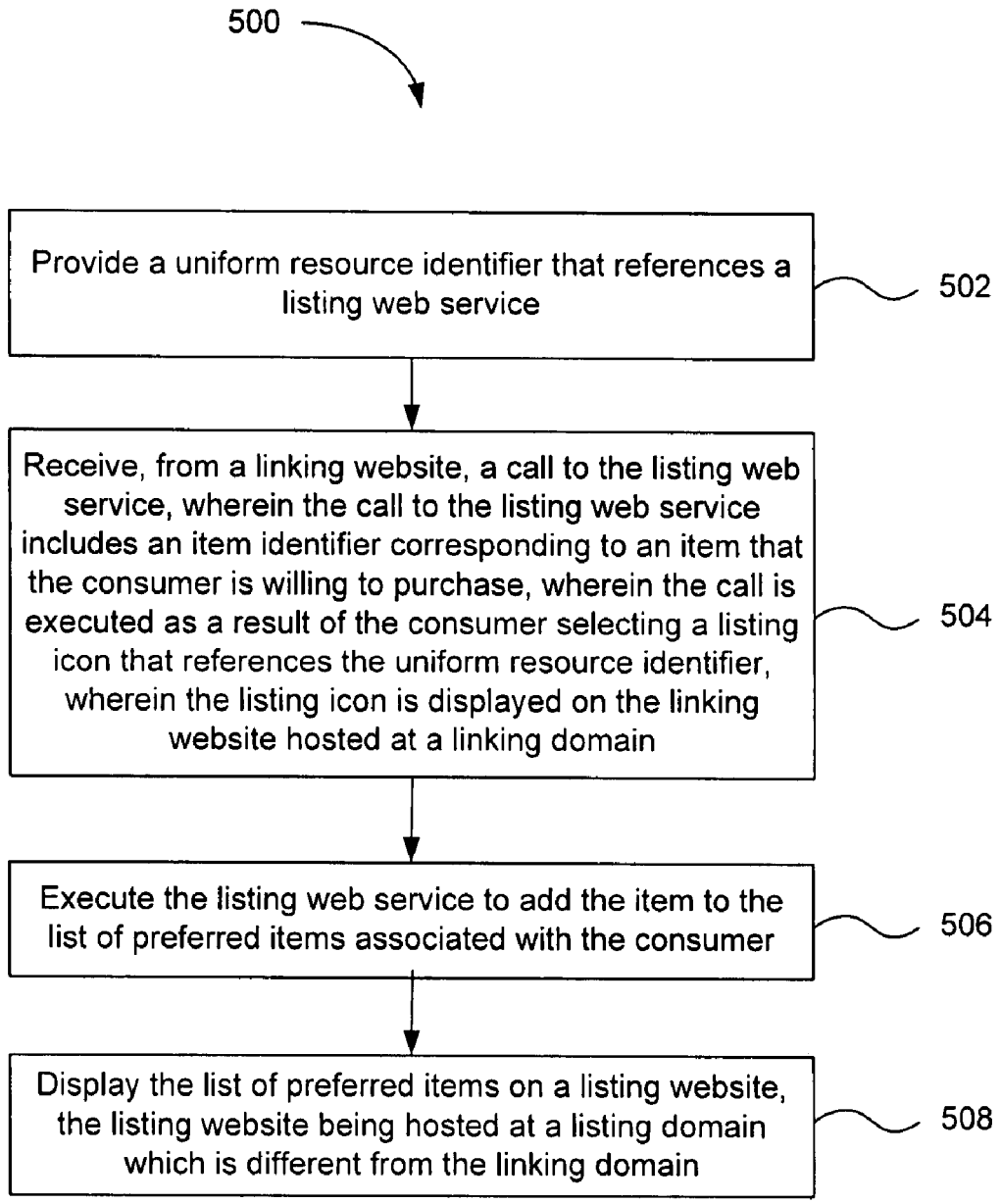
FIG. 5 illustrates a flow diagram of a process for adding an item to a preferred item list according to one embodiment.

FIG. 5 illustrates a flow diagram of a process for generating a list of preferred items according to one embodiment. At process block 502, a uniform resource identifier that references a listing web service is provided. The uniform resource identifier can be provided to a web server of the linking website so that the uniform resource identifier can be displayed at the linking website. Process 500 continues at process block 504.

At process block 504, a call to the listing web service can be received from a linking website. The call to the listing web service can include an item identifier corresponding to an item that the user is willing to purchase. The call can be executed as a result of the user selecting a listing icon that references the uniform resource identifier. The listing icon can be displayed on the linking website hosted at a linking domain. Process 500 continues at process block 506.

At process block 506, the listing web service is executed to add the item to the list of preferred items associated with the user. Process 500 continues at process block 508. At process block 508, the list of preferred items is displayed on a listing website. The listing website can be hosted at a listing domain which is different from the linking domain.

Figure 6:
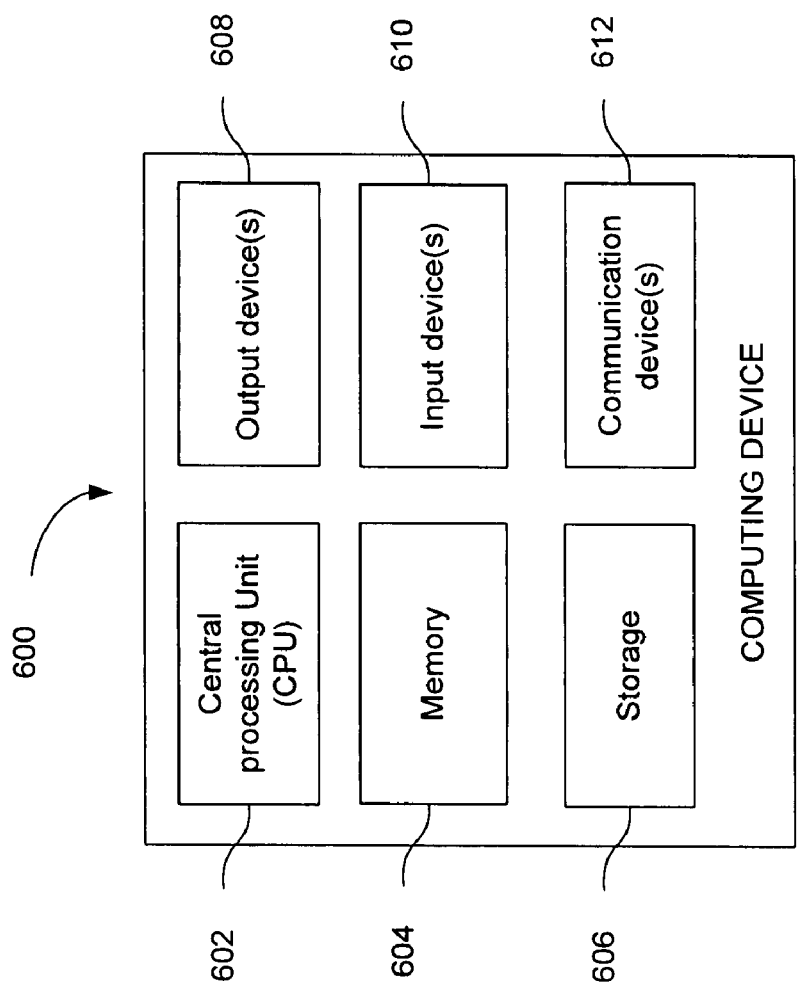
FIG. 6 illustrates a component diagram of a computing device for implementing one or more embodiments.

FIG. 6 illustrates a component diagram of a computing device according to one embodiment. The computing device 600 can be utilized to implement one or more computing devices, computer processes, or software modules described herein. In one example, the computing device 600 can be utilized to process calculations, execute instructions, receive and transmit digital signals. In another example, the computing device 600 can be utilized to process calculations, execute instructions, receive and transmit digital signals, receive and transmit search queries, and hypertext, compile computer code, as required by the consumer computing device 106, the merchant computing device 108, the merchant computing device 114, the listing web service 202, the web server 204, and the search engine 206.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604. Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 206. Computer storage media includes volatile and nonvolatile, removable and non-removable media implemented in any method or technology for storage of information such as computer readable instructions, data structures, program modules or other data. Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of generating a list of preferred items, comprising:
    providing a uniform resource identifier that references one or more computers providing a listing web service1 the uniform resource identifier being provided to a linking website;
    receiving, from the linking website, a call to the one or more computers providing the listing web service, wherein the call to the one or more computers providing the listing web service includes an item identifier corresponding to an item that a consumer is willing to purchase, wherein the call is executed by the linking website in response to the consumer selecting a listing icon that references the uniform resource identifier, wherein the listing icon is displayed on the linking website hosted at a linking domain;
    executing by the one or more computers providing the listing web service to add the item to the list of preferred items associated with the consumer; and
    displaying the list of preferred items, by the one or more computers providing the listing web service, the listing web service being hosted at a listing domain which is different from the linking domain.

2. The method of claim 1, wherein displaying the list of preferred items by the one or more computers providing the listing web service is performed such that the list of preferred items is viewable publicly.

3. The method of claim 1, wherein displaying the list of preferred items by the one or more computers providing the listing web service is performed such that the list of preferred items is viewable only to an entity that has been provided with viewing rights.

4. The method of claim 1, further comprising receiving a maximum price that the consumer is willing to pay for the item, the maximum price being received to display by the one or more computers providing the listing web service.

5. The method of claim 1, further comprising:
    receiving consumer information when the call to the one or more computers providing the listing web service is executed at the linking website; and
    selling the consumer information to merchants, the consumer information being indicative that the consumer is interested in purchasing the item.

6. The method of claim 1, further comprising collecting information of one or more consumers interested in purchasing the item so as to determine whether to purchase the item in bulk, the information being received when the call to the one or more computers providing the listing web service is executed.

7. The method of claim 1, further comprising purchasing the item in bulk by the one or more computers providing the listing web service and selling the item to the consumer.

8. A system for generating a list of preferred items, comprising:
    a web server computer that provides a uniform resource identifier to a linking website that references one or more computers providing a listing web service that is invoked by a call that includes an item identifier corresponding to an item that a consumer is willing to purchase, wherein the call is executed by the linking website in response to the consumer selecting a listing icon that references the uniform resource identifier, wherein the listing icon is displayed on the linking website hosted at a linking domain, wherein the one or more computers providing the listing web service are configured to add the item to the list of preferred items associated with the consumer; and
    the one or more computers providing the listing web service, that display the list of preferred items, the listing web service being hosted at a listing domain which is different from the linking domain.

9. The system of claim 8, wherein the one or more computers providing the listing web service display the list of preferred items such that the list of preferred items is viewable publicly.

10. The system of claim 8, wherein the one or more computers providing the listing web service display the list of preferred items such that the list of preferred items is viewable only to an entity that has been provided with viewing rights.

11. The system of claim 8, wherein the one or more computers providing the listing web service are further configured to receive a maximum price to display by the one or more computers providing the listing web service, the maximum price representing a price the consumer is willing to pay for the item.

12. The system of claim 8, further comprising a search engine that is configured to collect consumer information being indicative that the consumer is interested in purchasing the item in order to sell such consumer information to merchants, the consumer information including the item identifier associated with one or more consumers being received when the call is invoked.

13. The system of claim 8, further comprising a search engine that is configured to collect information of one or more consumers interested in purchasing the item so as to determine whether to purchase the item in bulk, the information being collected from the listing website.

14. A computerized method comprising steps:
- providing a uniform resource identifier that references one or more listing web service computers on a merchant computing device on a network;
- receiving a call to the one or more listing web service computers from the merchant computing device which acts as a linking website, the call to the one or more listing web service computers including an item identifier corresponding to an item that a consumer is willing to purchase, the call being executed as a result of the consumer selecting a listing icon that references the uniform resource identifier and invoking the one or more listing web service computers, the listing icon being displayed on the linking website hosted at a linking domain;
- invoking the one or more listing web service computers to add the item to a list of preferred items associated with the consumer; and
- displaying the list of preferred items by the one or more listing web service computers as part of a listing website, the listing website being hosted at a listing domain which is different from the linking domain.

15. The computerized method of claim 14, wherein the uniform resource identifier is represented visually as a listing icon displayed on the linking website.

16. The computerized method of claim 14, further comprising receiving a specific price to display by the one or more listing web service computers, the specific price representing a price the consumer is willing to pay for the item.

17. The computerized method of claim 14, further comprising:
- receiving consumer information when the call to the one or more listing web service computers is executed at the linking website; and
- selling the consumer information to merchants, the consumer information being indicative that the consumer is interested in purchasing the item.

18. The computerized method of claim 14, wherein displaying the list of preferred items by the one or more listing web service computers is performed such that the list of preferred items is viewable only to an entity that has been provided with viewing rights.

19. The computerized method of claim 14, wherein displaying the list of preferred items by the one or more listing web service computers is performed such that the list of preferred items is viewable publicly.

20. The method of claim 14, further comprising collecting information of one or more consumers interested in purchasing the item so as to determine whether to purchase the item in bulk, the information being received when the call to the one or more listing web service computers is executed.

* * * * *